United States Patent
Tamura et al.

(10) Patent No.: US 11,900,696 B2
(45) Date of Patent: Feb. 13, 2024

(54) METHOD AND SYSTEM FOR PROCESSING A PLURALITY OF IMAGES SO AS TO DETECT LANES ON A ROAD

(71) Applicants: TOYOTA MOTOR EUROPE, Brussels (BE); KATHOLIEKE UNIVERSITEIT LEUVEN, Leuven (BE)

(72) Inventors: Kazuki Tamura, Brussels (BE); Hiroaki Shimizu, Brussels (BE); Marc Proesmans, Leuven (BE); Frank Verbiest, Leuven (BE); Jonas Heylen, Leuven (BE); Bruno Dawagne, Leuven (BE); Davy Neven, Leuven (BE); Bert Debrabandere, Leuven (BE); Luc Van Gool, Leuven (BE)

(73) Assignees: TOYOTA MOTOR EUROPE, Brussels (BE); KATHOLIEKE UNIVERSITEIT LEUVEN, Leuven (BE)

( * ) Notice: Subject to any disclaimer, the term of this patent is extended or adjusted under 35 U.S.C. 154(b) by 0 days.

(21) Appl. No.: 17/636,191

(22) PCT Filed: Aug. 28, 2019

(86) PCT No.: PCT/EP2019/072933
§ 371 (c)(1),
(2) Date: Feb. 17, 2022

(87) PCT Pub. No.: WO2021/037350
PCT Pub. Date: Mar. 4, 2021

(65) Prior Publication Data
US 2022/0292846 A1    Sep. 15, 2022

(51) Int. Cl.
*G06V 20/58* (2022.01)
*G06V 20/56* (2022.01)
(Continued)

(52) U.S. Cl.
CPC ............ *G06V 20/588* (2022.01); *G06T 7/70* (2017.01); *G06T 7/80* (2017.01); *G06V 10/751* (2022.01);
(Continued)

(58) Field of Classification Search
CPC .......................... G06V 20/588; G06V 20/58
See application file for complete search history.

(56) References Cited

U.S. PATENT DOCUMENTS 6,819,779 B1 * 11/2004 Nichani ............... G06T 7/73
                                                       382/104
9,056,630 B2 *  6/2015 Han ..................... G08G 1/167
(Continued)

OTHER PUBLICATIONS

International Search Report and Written Opinion dated Apr. 30, 2020 in related International Application No. PCT/EP2019/072933.
(Continued)

*Primary Examiner* — Olisa Anwah
(74) *Attorney, Agent, or Firm* — Dinsmore & Shohl LLP

(57) ABSTRACT

A system and a method for processing a plurality of images, each image of the plurality of images being acquired by a respective image acquisition module of a vehicle and each image acquisition module being oriented outwardly with respect to the vehicle, the method comprising:
elaborating a bird's eye view image of surroundings of the vehicle using pixel values of pixels of at least one portion of each image of the plurality of images as pixel values of the bird's eye view image, and
performing, on the bird's eye view image, a detection of at least one lane marked on a surface on which the vehicle is and visible on the bird's eye view image.

12 Claims, 6 Drawing Sheets

(51) Int. Cl.
  *G06T 7/80* (2017.01)
  *G06T 7/70* (2017.01)
  *G06V 10/82* (2022.01)
  *G06V 10/75* (2022.01)

(52) U.S. Cl.
  CPC .... *G06V 10/82* (2022.01); *G06T 2207/20084* (2013.01); *G06T 2207/30256* (2013.01)

(56) References Cited

U.S. PATENT DOCUMENTS

| | | | |
|---|---|---|---|
| 10,115,026 B2 | 10/2018 | Mueter et al. | |
| 10,140,528 B2 | 11/2018 | Okano | |
| 10,449,899 B2* | 10/2019 | Gupta | B60R 1/00 |
| 2005/0031169 A1* | 2/2005 | Shulman | G06T 15/20 |
| | | | 382/104 |
| 2009/0296987 A1* | 12/2009 | Kageyama | G06V 20/588 |
| | | | 382/103 |
| 2010/0220190 A1* | 9/2010 | Hiroshi | G06T 5/006 |
| | | | 348/148 |
| 2015/0243169 A1* | 8/2015 | Tani | G08G 1/166 |
| | | | 348/148 |
| 2015/0266422 A1* | 9/2015 | Chundrlik, Jr | G06V 20/588 |
| | | | 348/148 |
| 2015/0367781 A1* | 12/2015 | Takemae | B60R 1/00 |
| | | | 348/148 |
| 2016/0180180 A1* | 6/2016 | Gupta | G06V 10/44 |
| | | | 348/148 |
| 2016/0314360 A1* | 10/2016 | Kizumi | G06V 20/588 |
| 2017/0300763 A1* | 10/2017 | Zou | H04N 7/181 |
| 2017/0330043 A1* | 11/2017 | Shih | G06V 20/588 |
| 2017/0369057 A1* | 12/2017 | Gurghian | G06V 10/82 |
| 2018/0189577 A1* | 7/2018 | Yoo | G06T 7/593 |
| 2019/0147253 A1* | 5/2019 | Bai | G06F 18/2413 |
| | | | 382/103 |
| 2019/0163993 A1* | 5/2019 | Koo | G06V 20/588 |
| 2019/0266418 A1* | 8/2019 | Xu | G06V 10/764 |
| 2019/0370566 A1* | 12/2019 | Su | B60W 30/12 |
| 2020/0014898 A1* | 1/2020 | Imai | G06V 20/58 |
| 2020/0074190 A1* | 3/2020 | Khakharia | G06V 10/82 |
| 2020/0210696 A1* | 7/2020 | Hou | G06V 10/242 |

OTHER PUBLICATIONS

Raquel Frizera et al, "Bird's Eye View Remapping and Path Following Based on Omnidirectional Vision", 2004, URL:http://citeseerx.ist.psu.edu/viewdoc/download?doi=10.1.1.529.9567&rep=rep1&type=pdf, XP055688026.

Kum Chang-Hoon et al., "Lane detection system with around view monitoring for intelligent vehicle", 2013 International SOC Design Conference (ISOCC), IEEE, Nov. 17, 2013 (Nov. 17, 2013), p. 215-218, XP032625119.

Yen-Ting Yeh, "Driver Assistance System Providing an Intuitive Perspective View of Vehicle Surrounding", Cham ISBN: 9783319166315, 2015, URL:http://imlab.tw/wp-content/uploads/2015/11/Driver-Assistance-System-Providing-an-Intuitive-Perspective-View-of-Vehicle-Surrounding.pdf, XP055473080, ISBN: 9783319166315.

Davy Nevin et al., "Towards End-to-End Lane Detection: an Instance Segmentation Approach", arXiv: 1 802.05591v1, Feb. 15, 2018.

* cited by examiner

METHOD AND SYSTEM FOR PROCESSING A PLURALITY OF IMAGES SO AS TO DETECT LANES ON A ROAD

CROSS-REFERENCE TO RELATED APPLICATIONS

This application is a National Stage of International Application PCT/EP2019/072933 filed on Aug. 28, 2019, the entire contents of which are hereby incorporated by reference

FIELD OF THE DISCLOSURE

The present disclosure is related to the field of image processing and to the detection of objects on an image, particularly lanes marked on a road.

DESCRIPTION OF THE RELATED ART

It is particularly desirable to perform detection of the lanes marked on roads on which vehicles are travelling, as this information is useful for assisting drivers or in automated driving. To this end, many lane detection methods have been proposed to be used in automotive applications such as lane keep assist, lane departure detection, or parking assist.

For example, the patent application US 2017/0068862 discloses a method that performs lane detection on the basis of a single image.

Similar methods can be used for forward traffic scene analysis, collision warning, and these methods typically use a single camera mounted in the vicinity of a vehicle's windshield. These methods have been proposed to perform detection of the two lanes surrounding a vehicle on a road (often called by the person skilled in the art as ego-lanes) or multiple lanes. These methods do not provide enough information because they only use a portion of the surroundings of the vehicle.

Other methods have proposed to detect lanes all around a vehicle, in a 360° manner, often called 360 surround lane detection. For example, document U.S. Pat. No. 9,056,630 discloses the use of a bird's eye view image (also called top view) which represents the surroundings of the vehicle, but, in this method, the immediate surroundings is limited to 1.5 to 3 meters.

In another example, patent document WO 2016013174 from Denso, a lane detection device is described, equipped with side and front detection units to detect, correct or compare lane division lines ahead and on the side. The method of this document is focused on ego-lane positioning.

These solutions cannot be used and are not satisfactory for applications other than maintaining a vehicle in its ego-lanes.

Among the obstacles preventing obtaining bird's-eye view images covering a greater zone, the person skilled in the art faces the wide angle of the cameras used, and the resolution of the cameras.

Known methods are often based on the visibility and the detection of the lane markers, they therefore require sufficient amounts of contrast (or gradient information) between markers and road area. These known methods may fail when the lane marker contrast is too low or when markers are far apart or occluded (for example by traffic) or missing.

From the prior art, document "Towards End-to-End Lane Detection: an Instance Segmentation Approach" (Davy Neven, Bert De Brabandere, Stamatios Georgoulis, Marc Proesmans, Luc Van Gool) is also known.

SUMMARY OF THE DISCLOSURE

The present disclosure overcomes one or more deficiencies of the prior art by proposing a method for processing a plurality of images, each image of the plurality of images being acquired by a respective image acquisition module of a vehicle and each image acquisition module being oriented outwardly with respect to the vehicle, the method comprising:

elaborating a bird's eye view image of the surroundings of the vehicle using the pixel values of the pixels of at least one portion of each image of the plurality of images as pixel values of pixels of the bird's eye view image, performing, on the bird's eye view image, a detection of at least one lane marked on the surface on which the vehicle is and visible on the bird's eye view image.

The images from the set of images may be RGB (Red-Green-Blue) images obtained by said image acquisition modules, for example cameras.

A bird's eye view refers to a view from the top of the vehicle, for example the view that a camera hovering over the vehicle and directed at the vehicle could capture.

The inventors of the present disclosure have observed that it is possible to equip a vehicle with a plurality of cameras and to use the images from these cameras to combine them into a bird's eye view image by directly using the pixel values of the pixels of the images, which provide simple and fast combination of the images into a single image which can show the surroundings within a distance of at least ten meters and not just 1.5 to 3 meters (and therefore including all the lanes of a road). More precisely, the portion of each image which corresponds to the road can be used for a portion of the bird's eye view image which shows portions of lanes around the vehicle.

Also, it is easier to perform detection of lanes marked on a road in the bird's eye view image rather than on a plurality of images.

According to a particular embodiment, the detection of lanes is performed using a neural network.

The inventors of the present disclosure have observed that neural network (a deep learning approach) can be used for the detection of lanes on bird's eye view images with the following advantages with respect to traditional non-deep learning approaches:

neural networks can better cope with differences in sharpness around the lanes marked on roads (on images directly obtained from cameras, distant lanes are smeared due to the limitations in term of resolution);

neural networks can handle occlusions of marked lanes by surrounding vehicles or by other structures, because neural networks can take into account the context of an entire image; thus, even if lanes partially appear or appear in an imperfect manner, a neural network can predict their position;

neural networks do not assume that lanes marked on a road are supposed to be straight, curved lanes, splits, or merges can be dealt with if there is sufficient data to train the neural network.

According to a particular embodiment, elaborating a bird's eye view image of the surroundings of the vehicle comprises using at least one look-up table to associate the pixels of said portions of the image of the plurality of images to pixels of the bird's eye view image.

Using at least one look-up table is a simple implementation of using the pixel values of the pixels of at least one portion of each image of the plurality of images as pixel values of pixels of the bird's eye view image.

According to a particular embodiment, elaborating a bird's eye view image of the surroundings of the vehicle comprises using a look-up table for each image of the plurality of image.

According to a particular embodiment, the method comprises obtaining position information of the vehicle from at least one sensor different from a camera and taking this position information into account when elaborating the bird's eye view image.

For example, a distance sensor may be used to determine the position of the vehicle with respect to the ground, for example a laser sensor such as a lidar (solid state or mechanical).

According to a particular embodiment, the method comprises performing, on the bird's eye view image, a detection of a plurality of lanes marked on the surface on which the vehicle is and visible on the bird's eye view image.

It should be noted that this detection may be performed using a single neural network.

For example, this neural network may assign to each pixel in the bird's eye view a label indicating whether this pixel belongs to a lane or not.

Additionally, the neural network may be configured to identify separate lanes as different instances. For example, each lane may be assigned a different identifier and the neural network may assign labels.

According to a particular embodiment, the method comprises a further post-processing step in which a curve is fitted on each detected lane, and a tracking step of the curve with respect to a previously obtained plurality of images.

According to a particular embodiment, fitting a curve on each detected lane is performed using a multi-curve fitting approach.

Multi-curve fitting approaches comprise fitting a plurality of curves quasi simultaneously, and obeying some geometrical constraints between the individual curves, for example a plurality of curves being parallel to one another and equidistant.

It should be noted that fitting a curve may comprise determining a curve that minimizes the distance between the pixels of a lane and a curve defined using a mathematical representation of a curve, typically a polynomial expression of a given order (second or third) or a spline (for example a piecewise spline).

Consequentially, tracking may be performed by subjecting the parameters of the curve (for example the polynomial values) to a process such as a Kalman filter or an extended Kalman filter.

According to a particular embodiment, the method comprises a preliminary calibration step to obtain calibration data in which pixels of the at least one portion of each image are associated with pixels of the bird's eye view image.

This calibration data contains information such as pairs of pixel locations (a pixel location of a pixel from an image of the plurality of image and a pixel location of a pixel in the bird's eye view image.

Also, the calibration step may comprise obtaining the intrinsic and extrinsic parameters of each image acquisition module. The person skilled in the art will know how to obtain these parameters, the intrinsic parameters being parameters that are internal and fixed to a particular image acquisition module and the extrinsic parameters being parameters that are external to the image acquisition module and which depend on the position and orientation of the image acquisition module.

By way of example, the calibration step may comprise elaborating the at least one look-up table (for example using the extrinsic and intrinsic parameters.

Also, by way of example, the extrinsic and intrinsic parameters may be obtained automatically through:
predefined measurements and/or patterns with known 3D position, which may be called short range measurements, and through
longer range measurements such as the ones described in document "Structure from Motion & Camera Self-Calibration" (Kassem Al Ismaeil, Université de Bourgogne), document "Multiple view geometry in computer vision" (Richard Hartley and Andrew Zisserman, Cambridge University Press, 2004).

Also, the calibration step may comprise receiving commands inputted by a user on a human machine interface.

The present disclosure also proposes a system for processing a plurality of images, each image of the plurality of images having been acquired by a respective image acquisition module of a vehicle and each image acquisition module being oriented outwardly with respect to the vehicle, the system comprising:
a module configured to elaborate a bird's eye view image of the surroundings of the vehicle using the pixel values of the pixels of at least one portion of each image of the plurality of images as pixel values of the bird's eye view image,
a module configured to perform, on the bird's eye view image, a detection of at least one lane marked on the surface on which the vehicle is and visible on the bird's eye view image.

This system may be configured to perform all the steps of the method as defined above.

The present disclosure also proposes a vehicle comprising the above defined system and equipped with said image acquisition modules.

In one particular embodiment, the steps of the method for processing an image are determined by computer program instructions.

Consequently, the present disclosure is also directed to a computer program for executing the steps of a method as described above when this program is executed by a computer.

This program can use any programming language and take the form of source code, object code or a code intermediate between source code and object code, such as a partially compiled form, or any other desirable form.

The present disclosure is also directed to a computer-readable information medium containing instructions of a computer program as described above.

The information medium can be any entity or device capable of storing the program. For example, the medium can include storage means such as a ROM, for example a CD ROM or a microelectronic circuit ROM, or magnetic storage means, for example a diskette (floppy disk) or a hard disk.

Alternatively, the information medium can be an integrated circuit in which the program is incorporated, the circuit being adapted to execute the method in question or to be used in its execution.

BRIEF DESCRIPTION OF THE DRAWINGS

How the present disclosure may be put into effect will now be described by way of example with reference to the appended drawings, in which.

DETAILED DESCRIPTION

An exemplary method processing a plurality of images will be described hereinafter, as well as a corresponding system embedded on a vehicle.

Figure 1:
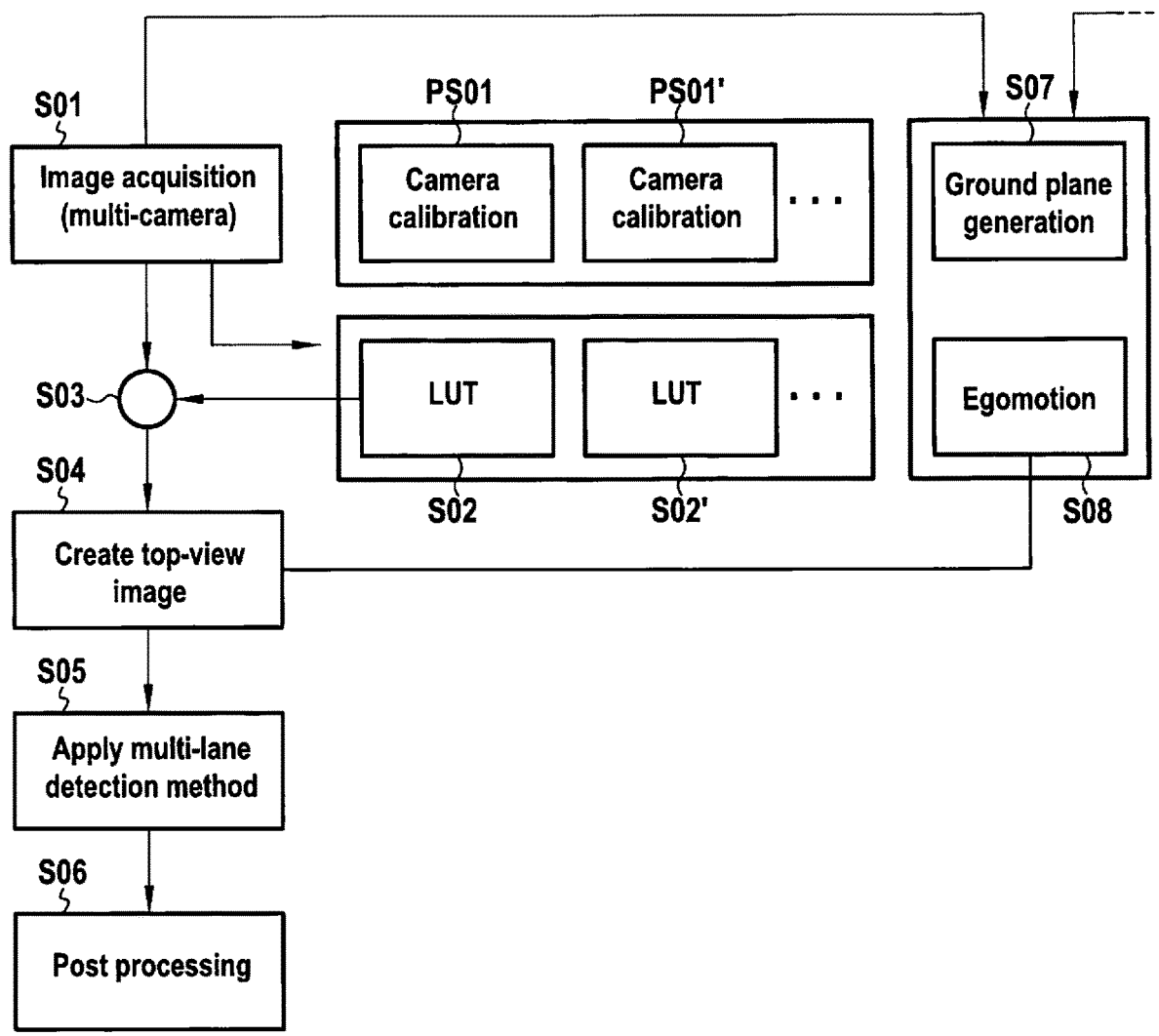
FIG. 1 is a block diagram of an exemplary method for processing a plurality of images according to an example.

A method for processing an image is represented on FIG. 1. This method is able to detect a plurality of lanes marked on a road which are visible or at least partially visible on a plurality of images acquired in step S01 by a plurality of image acquisition module (typically a camera) of a vehicle circulating on a road. For example, step S01 may comprise the acquisition of an image taken from the front of the vehicle, an image taken from the back of the vehicle, and images taken from both lateral sides of the vehicle. The person skilled in the art will know how to place cameras around a vehicle so that each image acquired shows at least a portion of the road. Also, in this example, all the cameras are oriented outwardly with respect to the vehicle (their field of view is oriented outwardly).

In step S02, for an image acquired in step S01, a look-up table is used which receives this image and outputs the pixel values (for example Red Green Blue values) for a portion of the image, typically the portion on which the road should be seen on the image.

It should be noted that the present disclosure is not limited to the use of look-up tables but also concerns other means to elaborate bird's eye view images using the pixel values of the pixels of at least one portion of each image of the plurality of images as pixel values of pixels of the bird's eye view image.

In order to perform step S02 a preliminary step PS01 can be performed so as to determine which pixel positions of the images of a camera correspond to possible pixel positions in a bird's eye view image. By way of example, this preliminary step is a calibration step performed by an operator, or performed automatically using a detection method (for example an image segmentation method known by the person skilled in the art).

For another image acquired in step S01, a step S02' identical to the previously described S02 is performed. A different calibration is performed for this camera in the preliminary step PS01'. The calibration step is different in that it concerns a camera with a different field of view or viewing angle; for example, one could show an image taken from the back of the vehicle while the other could show an image taken from the front of the vehicle.

Additional steps may be performed for other images acquired in step S01. It should be noted that steps S02, S02', PS01, and PS01' may be affected by a position information of the vehicle from at least one sensor different from a camera (for example a distance sensor) so that this position information is taken into account in these steps.

For example, the distance between the ground and the vehicle may vary and can lead to applying an offset in the look-up tables.

In step S03, the output of each look-up stable is assembled, so that in step S04, a bird's eye view image is elaborated. In this image, each pixel in a portion of each image acquired in step S01 is associated in at least a portion of the bird's eye view image.

For example, for an image taken from the front of the vehicle, the pixel values of a lower portion of this image are associated with pixels on one side of the bird's eye view image, and for an image taken from the back of the vehicle, the pixel values of a lower portion of this image are associated with pixels on an opposite side of the bird's eye view image.

In step S05, a multi-lane detection method processes the bird's eye view image obtained in step S04, and this detection may be performed by a neural network. For example, this neural network may have a deep neural network structure (for example a convolutional neural network trained using annotations of bird's eye view images).

Additionally, a post-processing step S06 may be performed in which a curve is fitted on each detected lane (for example defined with curve parameters, i.e. polynomial coefficients), and a tracking step of the curve with respect to a previously obtained plurality of images (for example using the curve parameters).

Additionally, steps S07 and S08 may be performed using the acquired images of step S01 and the bird's eye view of step S04 so as to perform ground plane generation (step S07) and ego-motion (step S08).

For example, ground plane generation may be carried out during a calibration step, wherein the ground plane position underneath the car (in stand-still) is determined. Also, ego-motion detection may comprise determining the relative position of the car with respect to the ground plane, the suspension of the car allowing relative motion between the vehicle and its wheels to absorb changes and vibrations of the road structure. Thus, the ground plane determined during the calibration may move with respect to the vehicle.

Figure 2A:
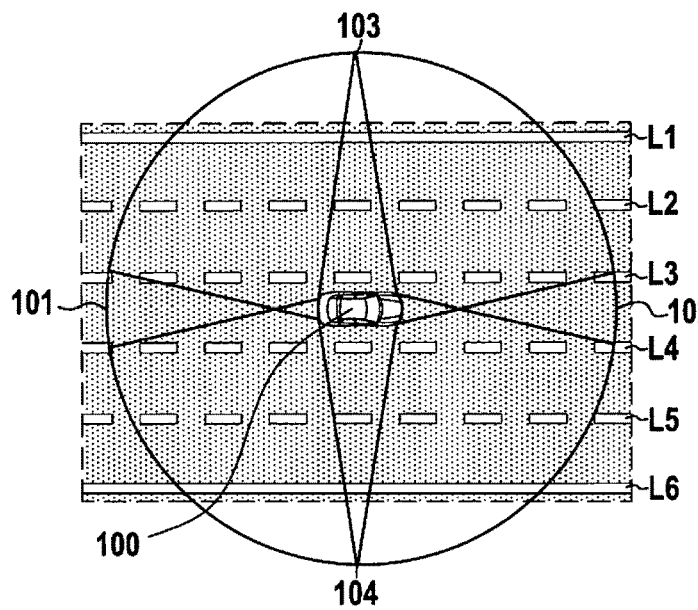
FIG. 2A is a graphical representation showing the elaboration of the bird's eye view image.

FIG. 2A is a schematic representation of a bird's eye view above a vehicle 100, on a road where lanes L1, L2, L3, L4, L5, and L6 are marked.

The vehicle 100 is equipped with four cameras having fields of view visible on the figure: 101 at the back of the vehicle, 102 at the front of the vehicle, 103 on the left side of the vehicle and 104 on the right side of the vehicle.

The present disclosure is however not limited to 4 cameras, more than four cameras may be used, for example 6 or 8 cameras.

Figure 2B:
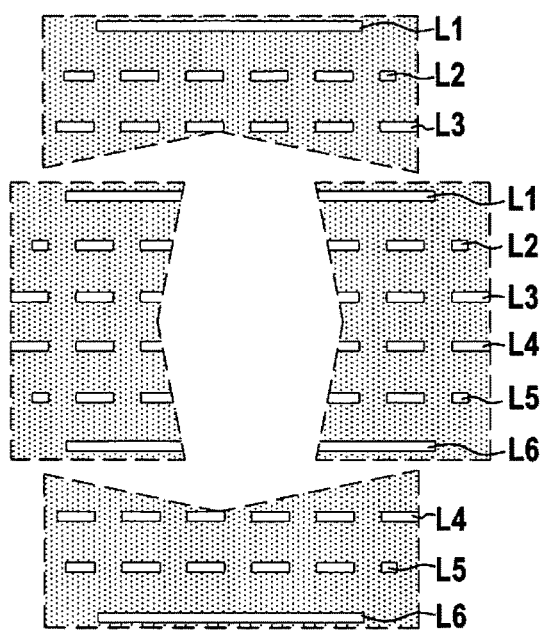
FIG. 2B is another graphical representation showing the elaboration of the bird's eye view image.
Figure 2C:
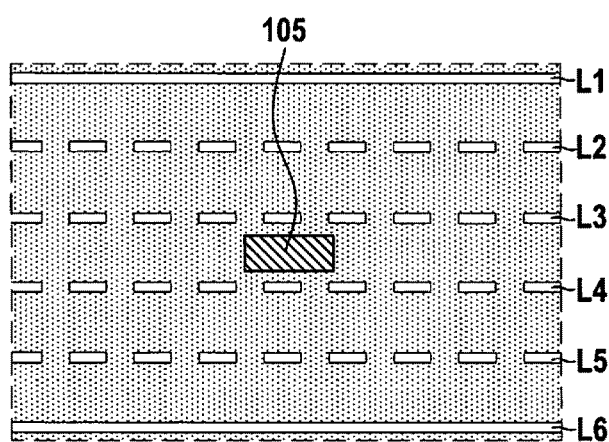
FIG. 2C is yet another graphical representation showing the elaboration of the bird's eye view image.

FIG. 2B shows the four portions of each image which will be used to elaborate the bird's eye view image. Each portion is a mask and these masks will be assembled to form the bird's eye view of FIG. 2C. While the vehicle itself is not visible on any acquired image, a graphical representation of the vehicle 105 can be placed on the bird's eye view image.

Figure 3A:
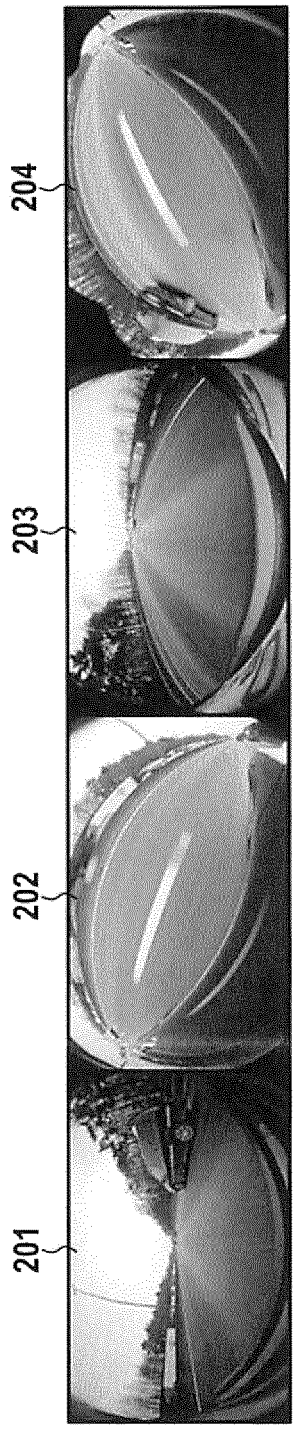
FIG. 3A shows images obtained by cameras on a vehicle and the corresponding bird's eye view.

FIG. 3A shows four actual photographs 201, 202, 203, and 204 taken by cameras all pointing to different directions around a vehicle.

These cameras, and all the cameras that may be used to implement the present disclosure, may be fisheye cameras: their focal length may be less than 16 millimeters, for example less than 8 millimeters, alternatively, a fisheye camera may be defined as a camera having an angular field above 180°, for example approximatively 190°.

The present disclosure is however not limited to fisheye cameras and may also be implemented using other types of cameras such as pinhole cameras.

Figure 3B:
FIG. 3B shows another image obtained by cameras on a vehicle and the corresponding bird's eye view.

FIG. 3B shows the bird's eye view image obtained with the images of FIG. 3A, for example using the method of FIG. 1.

Figure 4A:
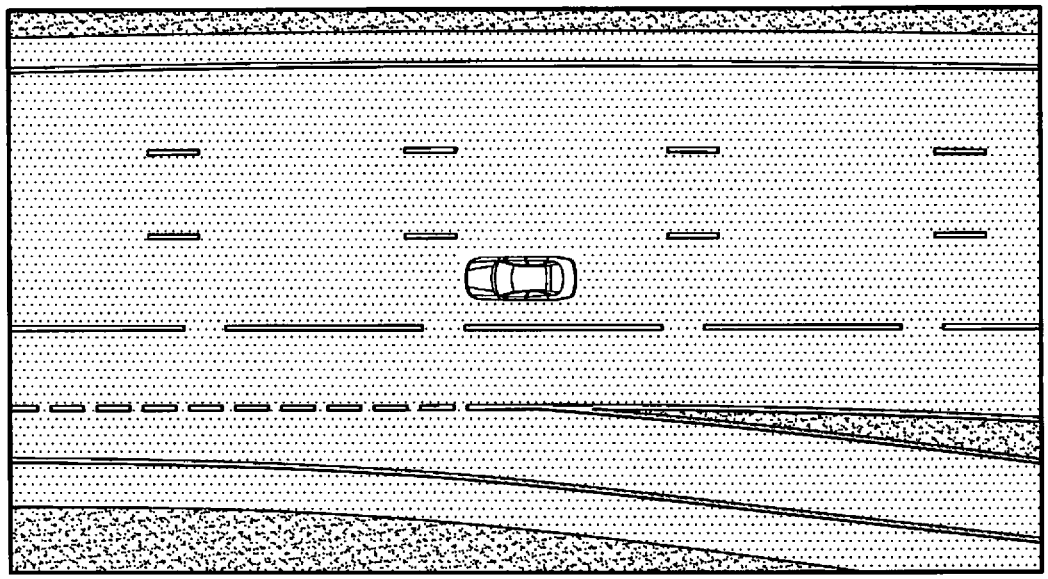
FIG. 4A shows a bird's eye view and a graphical representation of the lanes marked on the road and their detection.
Figure 4B:
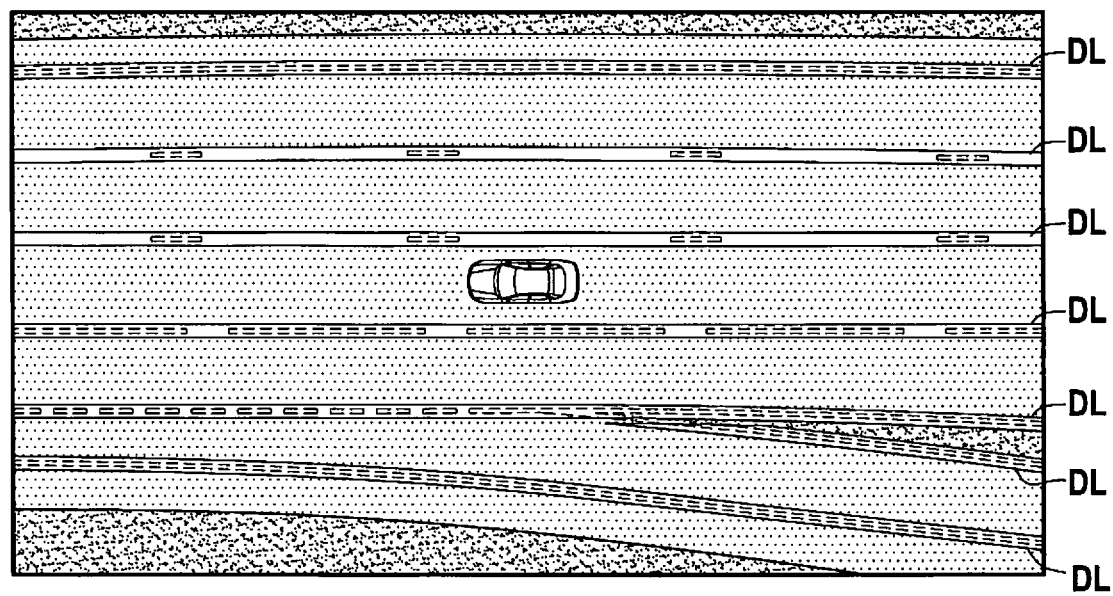
FIG. 4b shows another bird's eye view and a graphical representation of the lanes marked on the road and their detection.

FIG. 4A shows another example of a bird's eye view while FIG. 4B shows the detected lanes DL in a highlighted manner by implementing the method of FIG. 1. In this illustrated example, the lanes are merely detected as lanes but there is no detection of each individual lane; for example, this detection indicates whether individual pixels of the image belong to a lane or not.

Figure 4C:
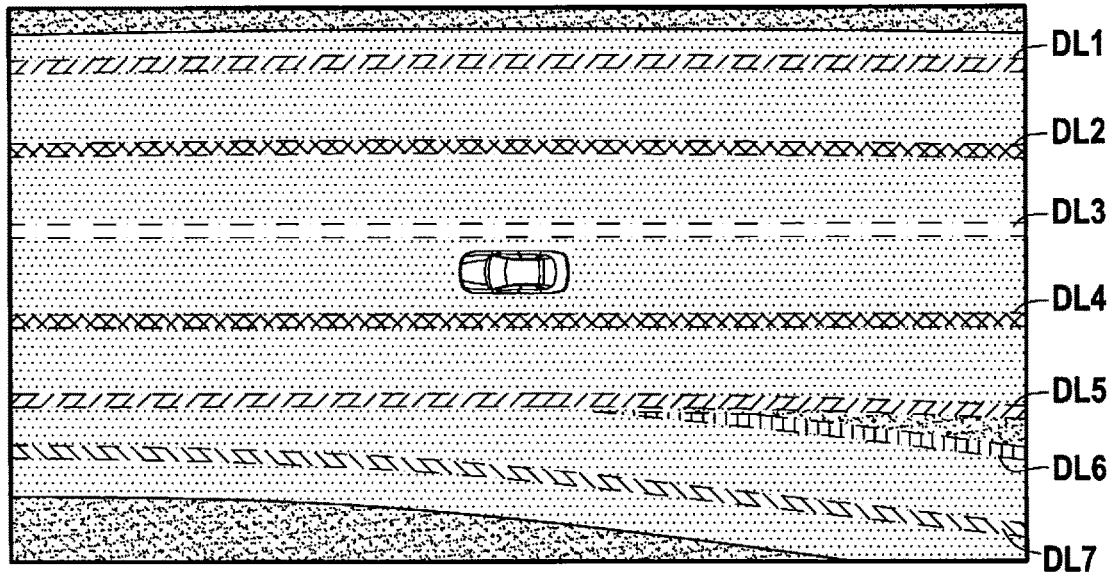
FIG. 4C shows yet another bird's eye view and a graphical representation of the lanes marked on the road and their detection.

In FIG. 4C, the detection step is configured to identify each individual lane which leads to the detection of detected lanes L1, L2, L3, L4, L5, L6, and L7.

Figure 4D:
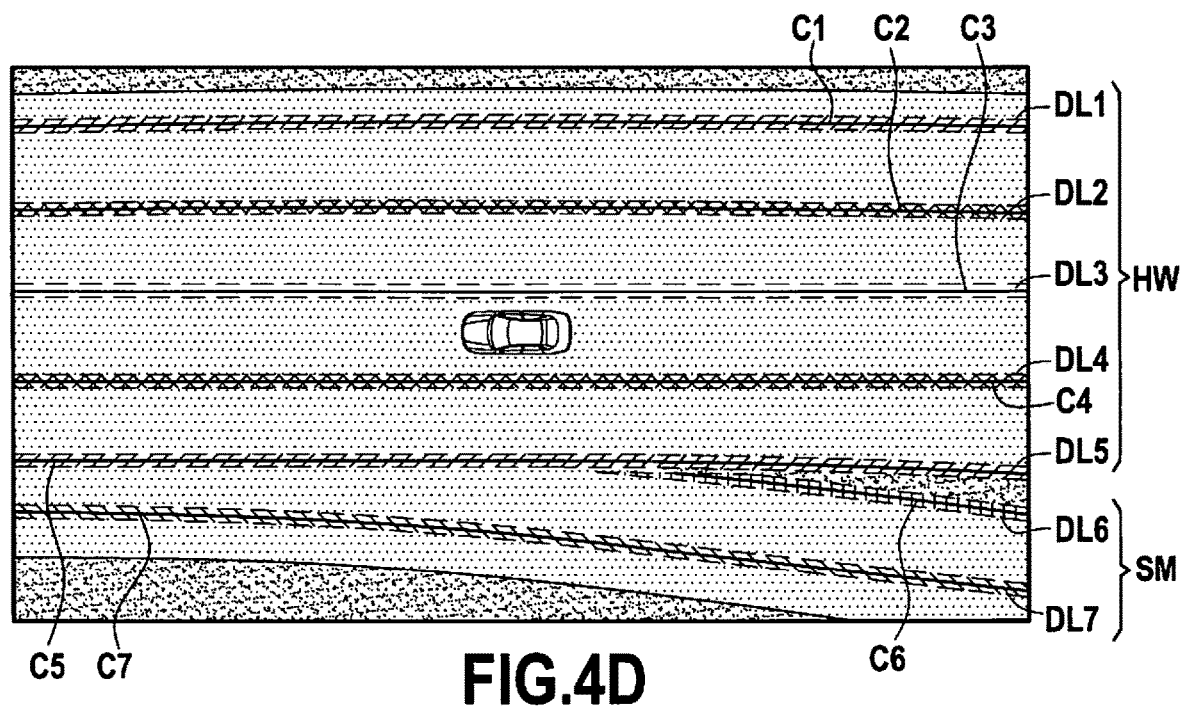
FIG. 4D shows still another bird's eye view and a graphical representation of the lanes marked on the road and their detection.

In FIG. 4D, a subsequent curve fitting is performed in a multi-curve fitting approach so that curves C1, C2, C3, C4, C5, C6, and C7 are respectively fitted on the detected lanes L1, L2, L3, L4, L5, L6, and L7. These curves C1 to C7 may be associated with parameters such as polynomial parameters, and a tracking may be performed over time using these parameters.

Also, it is also possible to use detection means such as a neural network which is trained to distinguish standard highway lanes (marked HW) and split or merge lanes (marked SM).

Figure 5:
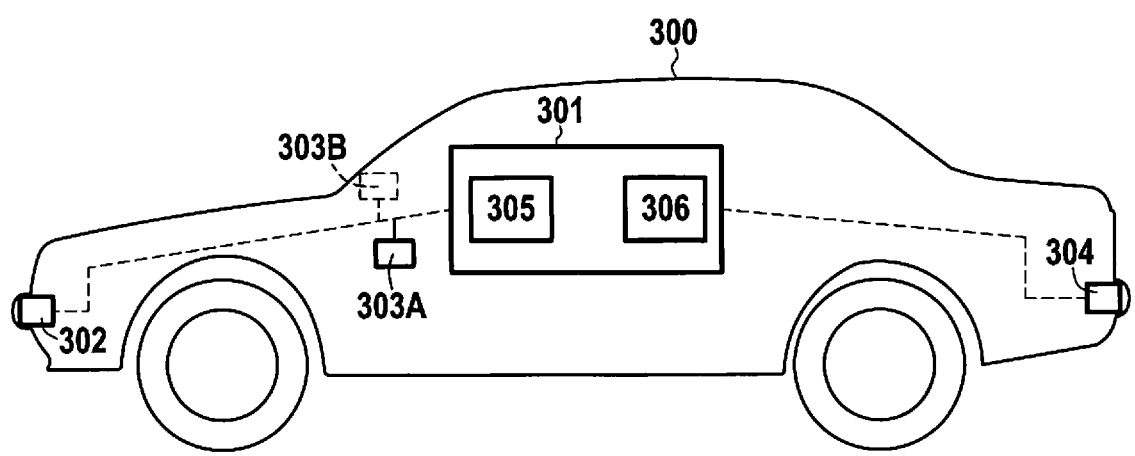
FIG. 5 is a schematic representation of a vehicle according to an example.

FIG. 5 shows a vehicle 300 comprising a system 301 configured to implement the method of FIG. 1. The vehicle is further equipped with image acquisition modules 302, 303A, 303B (image acquisition modules 303A and 303B being located around the mirrors of the vehicle, image acquisition module 303B being on the hidden side of the vehicle) and 304 (e.g., cameras), each being oriented outwardly with respect to the vehicle and toward a different direction.

The system 301 may have the structure of a computer comprising a processor and a non-volatile memory including computer program instructions to perform the method of FIG. 1.

The system 301 may therefore comprise:
a module 305 configured to elaborate a bird's eye view image of the surroundings of the vehicle using at least one look-up-table receiving as input the images of the plurality of images and configured, for each image, to associate each pixel in at least a portion of the image to a pixel position in at least a portion of the bird's eye view image,
a module 306 configured to perform, on the bird's eye view image, a detection of at least one lane marked on the surface on which the vehicle is and visible on the bird's eye view image.

These modules may be implemented by computer instructions executed by a processor of the system 301.

Also, the look up tables can be stored in a non-volatile memory of the system 301.

Although the present disclosure has been described above with reference to certain specific embodiments, it will be understood that the present disclosure is not limited by the particularities of the specific embodiments. Numerous variations, modifications and developments may be made in the above-described embodiments within the scope of the appended claims.

The invention claimed is:

1. A method for processing a plurality of images, each image of the plurality of images being acquired by a respective image acquisition module of a vehicle and each image acquisition module being oriented outwardly with respect to the vehicle, the method comprising:
   elaborating a bird's eye view image of surroundings of the vehicle using pixel values of pixels of at least one portion of each image of the plurality of images as pixel values of the bird's eye view image,
   performing, on the bird's eye view image, a detection of at least one lane marked on a surface on which the vehicle is and visible on the bird's eye view image,
   wherein the detection is performed based on an indication of whether individual pixels of the bird's eye view image belong to a lane, and
   fitting a curve on the lane by determining the curve that minimizes a distance between pixels that belong to the lane and pixels that belong to a curve defined using a mathematical representation of the curve.

2. The method of claim 1, wherein the detection of lanes is performed using a neural network.

3. The method of claim 1, wherein elaborating the bird's eye view image of the surroundings of the vehicle comprises using at least one look-up table to associate the pixels of said portions of the image of the plurality of images as pixel values of pixels of the bird's eye view image.

4. The method of claim 3, wherein elaborating the bird's eye view image of the surroundings of the vehicle comprises using a look-up table for each image of the plurality of image.

5. The method of claim 1, comprising obtaining position information of the vehicle from at least one sensor different from a camera and taking this position information into account when elaborating the bird's eye view image.

6. The method of claim 1, comprising performing, on the bird's eye view image, a detection of a plurality of lanes marked on the surface on which the vehicle is and visible on the bird's eye view image.

7. The method of claim 1, comprising a further post-processing step in which the curve is fitted on each detected lane, and a tracking step of the curve with respect to a previously obtained plurality of images.

8. The method of claim 7, wherein fitting the curve on each detected lane is performed using a multi-curve fitting approach.

9. The method of claim 1, comprising a preliminary calibration step to obtain calibration data in which pixels of the at least one portion of each image are associated with pixels of the bird's eye view image.

10. A system for processing a plurality of images, each image of the plurality of images having been acquired by a respective image acquisition module of a vehicle and each image acquisition module being oriented outwardly with respect to the vehicle, the system comprising:
   a module configured to elaborate a bird's eye view image of surroundings of the vehicle using pixel values of pixels of at least one portion of each image of the plurality of images as pixel values of the bird's eye view image, a module configured to perform, on the bird's eye view image, a detection of at least one lane marked on a surface on which the vehicle is and visible on the bird's eye view image, wherein the detection is performed based on an indication of whether individual pixels of the bird's eye view image belong to a lane, and a module configured to fit a curve on the lane by determining the curve that minimizes a distance between pixels that belong to the lane and pixels that belong to a curve defined using a mathematical representation of the curve.

11. A vehicle comprising the system of claim 10 and equipped with said image acquisition modules.

12. A non-transitory recording medium readable by a computer and having recorded thereon a computer program including instructions for executing a method for processing a plurality of images, each image of the plurality of images being acquired by a respective image acquisition module of a vehicle and each image acquisition module being oriented outwardly with respect to the vehicle, the method comprising:

elaborating a bird's eye view image of surroundings of the vehicle using pixel values of pixels of at least one portion of each image of the plurality of images as pixel values of the bird's eye view image, performing, on the bird's eye view image, a detection of at least one lane marked on a surface on which the vehicle is and visible on the bird's eye view image, wherein the detection is performed based on an indication of whether individual pixels of the bird's eye view image belong to a lane, and fitting a curve on the lane by determining the curve that minimizes a distance between pixels that belong to the lane and pixels that belong to a curve defined using a mathematical representation of the curve.

* * * * *